United States Patent
Maeda et al.

(10) Patent No.: US 7,434,945 B2
(45) Date of Patent: Oct. 14, 2008

(54) ILLUMINATING DEVICE AND PROJECTION TYPE VIDEO DISPLAY APPARATUS

(75) Inventors: Makoto Maeda, Osaka (JP); Takashi Ikeda, Osaka (JP); Yoshitaka Kurosaka, Hyogo (JP)

(73) Assignee: Sanyo Electric Co., Ltd., Moriguchi-shi (JP)

(*) Notice: Subject to any disclaimer, the term of this patent is extended or adjusted under 35 U.S.C. 154(b) by 248 days.

(21) Appl. No.: 11/268,732

(22) Filed: Nov. 8, 2005

(65) Prior Publication Data

US 2006/0114423 A1    Jun. 1, 2006

(30) Foreign Application Priority Data

Nov. 10, 2004  (JP) ............................. 2004-326921
May 31, 2005   (JP) ............................. 2005-160687

(51) Int. Cl.
   *G03B 21/14* (2006.01)
(52) U.S. Cl. ........................... 353/99; 353/31; 348/743; 362/231; 359/634
(58) Field of Classification Search .................. 353/30, 353/31, 33, 34, 37, 98, 99; 349/5, 7, 8, 9; 359/629, 634, 636; 348/742, 743; 362/231, 362/234
See application file for complete search history.

(56) References Cited

U.S. PATENT DOCUMENTS

| | | | | |
|---|---|---|---|---|
| 5,619,284 A | * | 4/1997 | Magocs | 348/757 |
| 6,139,166 A | * | 10/2000 | Marshall et al. | 362/231 |
| 6,918,682 B2 | * | 7/2005 | Kim et al. | 362/231 |
| 7,070,281 B2 | * | 7/2006 | Kato | 353/20 |
| 7,237,909 B2 | * | 7/2007 | Yokote et al. | 353/94 |
| 2005/0219468 A1 | * | 10/2005 | Yoshii et al. | 353/31 |
| 2005/0219478 A1 | * | 10/2005 | Yoshii et al. | 353/99 |
| 2006/0279701 A1 | * | 12/2006 | O'Donnell et al. | 353/20 |

FOREIGN PATENT DOCUMENTS

| | | |
|---|---|---|
| JP | 10-186507 | 7/1998 |
| JP | 2002-189263 | 7/2002 |

* cited by examiner

*Primary Examiner*—William C. Dowling
(74) *Attorney, Agent, or Firm*—Westerman, Hattori, Daniels & Adrian, LLP.

(57) ABSTRACT

A projection type video display apparatus is provided with an LED array for emitting light in red, an LED array for emitting light in green, and an LED array for emitting light in blue. On a light-incident side of a rod integrator, time-dividing mirrors 2A, 2B arranged in a cross manner, for guiding the light from each LED array to an inside of the rod integrator, are arranged. Furthermore, on a light-emission side of the LED array for emitting the light in red, a time-diving mirror is arranged, and on a light-emission side of the LED array for emitting the light in blue, a time-dividing mirror is provided. Each time-dividing mirror switch either to reflect the light or to transmit the light, depending on whether or not voltage is applied thereto. At time-dividing lighting timing of the LED arrays, the time-dividing mirrors switch either to reflect the light or to transmit the light. In addition, video signals of videos of respective colors are supplied to a liquid crystal display panel in a time-dividing manner.

20 Claims, 10 Drawing Sheets

(a) THE LED 41b EMITS LIGHT IN RED (b) THE LED 41b EMITS LIGHT IN BLUE (c) THE LED 41a EMITS LIGHT IN GREEN

ILLUMINATING DEVICE AND PROJECTION TYPE VIDEO DISPLAY APPARATUS

BACKGROUND OF THE INVENTION

Field of the Invention

The present invention relates to an illuminating device and a projection type video display apparatus.

A generally used illuminating device used for a liquid crystal projector, etc., is formed of a lamp such as an ultra-high pressure mercury lamp, a metal halide lamp, a xenon lamp, etc., and a parabolic reflector for collimating radiated light from the lamp. Furthermore, such the illuminating device includes an illuminating device provided with an integrating function (referring to a function for superimposing and converging onto an object to be illuminated a plurality of illuminating areas in a predetermined shape formed in a sampling manner on a plain surface by an optical device) by a pair of fly's eye lenses in order to reduce non-uniformity of light on an irradiating surface. Furthermore, in recent years, it is attempted to use a light-emitting diode (LED) as a light source (see Japanese Patent Laying-open No. H10-186507, Japanese Patent Laying-open No. 2002-189263). In addition, as an illuminating device, it has been proposed a configuration such that light in red from a light-in-red LED, light in green from a light-in-green LED, and light in blue from a light-in-blue LED are guided to desired directions, respectively, by using a cross dichroic mirror.

SUMMARY OF THE INVENTION

As FIG. 11 shows, a cross dichroic mirror 102 is formed of a dichroic mirror 102A for reflecting light in red from a light-in-red LED 100R, and a dichroic mirror 102B for reflecting light in blue from a light-in-blue LED 100B. The light in red from the light-in-red LED 100R is reflected by the dichroic mirror 102A, and guided to a rod integrator 103. The light in blue from the light-in-blue LED 100B is reflected by the dichroic mirror 102B, and guided to the rod integrator 103. On the other hand, light in green from a light-in-green LED 100G passes through the dichroic mirror 102A and the dichroic mirror 102B, and is guided to the rod integrator 103. However, as FIG. 12 shows, the dichroic mirror 102A and the dichroic mirror 102B reflects some portion of the light in green from the light-in-green LED 100G. That is, as FIG. 13 shows, there is a problem that in an illuminating device using the cross dichroic mirror 102, some portion of the light in green is cut, and thus, it is not possible to sufficiently guide the light in green forwardly.

In view of the above problem, an object of the present invention is to provide an illuminating device and a projection type video display apparatus capable of reducing a loss of light in color from a light source as much as possible.

In order to solve the above problems, an illuminating device according to the present invention comprises a light source for emitting light in red, a light source for emitting light in green, a light source for emitting light in blue, a lighting control means for lighting the three light sources in a time-dividing manner, a time-dividing optical switching element arranged for guiding the light from each light source into the same or the approximately same direction, and capable of switching either to reflect the light or to transmit the light, depending on whether or not voltage is applied to the a time-dividing optical switching element, an element control means for bringing the time-dividing optical switching element into a reflecting state when a certain light source is lighted, and bringing the time-dividing optical element into a transmitting state when another certain light source is lighted, an optical integrator for rendering uniform intensity of light incident from each light source, and reflecting means arranged on light-emission sides of the two light sources out of the three light sources, and configured to transmit each light from the respective two light sources, and on the other hand, to reflect the light from the other light source (the reflecting means is optically constructed, or is configured to be capable of controlling performing such the reflection).

In addition, an illuminating device according to the present invention comprises a light source for emitting light in red, a light source for emitting light in green, a light source for emitting light in blue, a lighting control means for lighting the three light sources in a time-dividing manner, a time-dividing optical switching element arranged for guiding the light from each light source into the same or the approximately same direction, and capable of switching either to diffract the light or to transmit the light, depending on whether or not voltage is applied to the time-dividing optical switching element, an element control means for bringing the time-dividing optical switching element into a diffracting state when a certain light source is lighted, and bringing the time-dividing optical switching element into a transmitting state when another certain light source is lighted, an optical integrator for rendering uniform intensity of light incident from each light source, and reflecting means arranged on light-emission sides of the two light sources out of the three light sources, and configured to transmit each light from the respective two light sources, and on the other hand, to reflect the light from the other light source (the reflecting means is optically constructed, or is configured to be capable of controlling performing such the reflection). In this section, the above-described two configurations are referred to as a first configuration.

In the above-described first configuration, it is possible to guide the light of respective color from each light source to the same or the approximately same direction, not using the cross dichroic mirror, and reduce a loss of light from the light sources as much as possible.

In the above-described first configuration, it may be configured such that the time-dividing optical switching element is arranged in a cross manner, the two light sources are positioned in such a manner as to sandwich the cross-shaped time-dividing optical switching element and as to face each other, the optical integrator and the other light source are positioned in such a manner as to sandwich other specific sides of the cross-shaped time-dividing optical switching element, and furthermore, on the light-emission sides of the two light sources, as the reflecting means, time-dividing mirrors capable of switching either to reflect the light or to transmit the light, depending on whether or not the voltage is applied, are arranged in such a manner as to be flush with or approximately flush with side surfaces of the optical integrator, and the time-dividing mirrors are controlled, as a result of voltage being applied or not being applied, in order that the time-dividing mirrors are in the reflecting state when the other light source is lighted.

In addition, in the first configuration, it may be configured such that the time-dividing optical switching element is arranged in a cross manner, the two light sources are positioned in such a manner as to sandwich the cross-shaped time-dividing optical switching element and as to face each other, the optical integrator and the other light source area positioned in such a manner as to sandwich other specific sides of the cross-shaped time-dividing optical switching element, and furthermore, on the light-emission sides of the two light sources, dichroic mirrors, as the reflecting means, are arranged in such a manner as to be flush with or approximately flush with side surfaces of the optical integrator.

In the first configuration, or a configuration according thereto, it is preferable that the other light source is a light source for emitting light in green.

In addition, in the first configuration, an illuminating device may be configured such that the optical integrator is a tube-shaped or a pole-shaped rod integrator, the time-dividing optical switching element is arranged on an edge side of the rod integrator, a first dichroic mirror, as the reflecting means, is positioned on a side surface of the rod integrator, a second dichroic mirror, as the reflecting means, is positioned on the other side surface of the rod integrator, the light source arranged on the first dichroic mirror is positioned in such a manner that a main light axis of the light source faces the edge side, the light source arranged on the second dichroic mirror is positioned in such a manner that a main light axis of the light source faces the edge side, and the other light source is positioned on the time-dividing optical switching element. In such the configuration, the other light source arranged on the time-dividing optical switching element is a light source for emitting light in green.

In the illuminating device according to these configurations, each of the light sources may be formed of one or a plurality of solid light-emitting elements.

Furthermore, in an illuminating device according to these configurations, on a light-emission side of each light source, there may be provided a polarization conversion system for redirecting a polarization of the light to a common direction. Or, on a light-exit side of the optical integrator, there may be provided a polarization conversion system for redirecting a polarization of light to a common direction.

In addition, a projection type video display apparatus according to the present invention comprises any one of the above-described illuminating devices, a video display panel arranged on a light-exit side of the optical integrator, a panel driver for supplying video data of respective colors to the video display panel corresponding to lighting timing of the light sources, and a projection means for projecting image light optically modulated as a result of passing through the video display panel.

In addition, an illuminating device according to the present invention is an illuminating device including at least light sources of three colors, that is, red, blue, and green, and comprises a first light source portion provided with a light source of a first color, our of the three colors, a second light source portion provided with light sources of second and third colors, out of the three colors, and having a light-emission direction different from that of the first light source portion, a composing means for composing light of both colors from the first light source portion and the second light source portion, and guiding such the light to the same or the approximately same direction, and a lighting control means for lighting the light source of the first color, the light source of the second color, and the light source of the third color, in a time-dividing manner, in which the composing means comprises a time-dividing reflecting means capable of switching either to reflect the light or to transmit the light, depending on whether or not voltage is applied to the time-dividing reflecting means, an element control means for bringing the time-dividing reflecting means into a reflecting state when a certain light source is lighted, and bringing the time-dividing reflecting means into a transmitting state when another certain light source is lighted (Hereinafter, referred to as a second configuration in this section).

Furthermore, a projection type video display apparatus according to the present invention comprises the illuminating device according to the second configuration, one video display panel arranged on an light-emission side of the illuminating device, a means for supplying video signals for respective colors to the video display panel in synchronous with emitting timing of each light, and a projection means for projecting video light obtained as a result of passing through the video display panel.

According to the present invention, it is possible to reduce a loss of light from the light sources as much as possible.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an illuminating device and a projection type video display apparatus of an embodiment of the present invention will be described based on FIG. 1 to FIG. 7.

Figure 1:
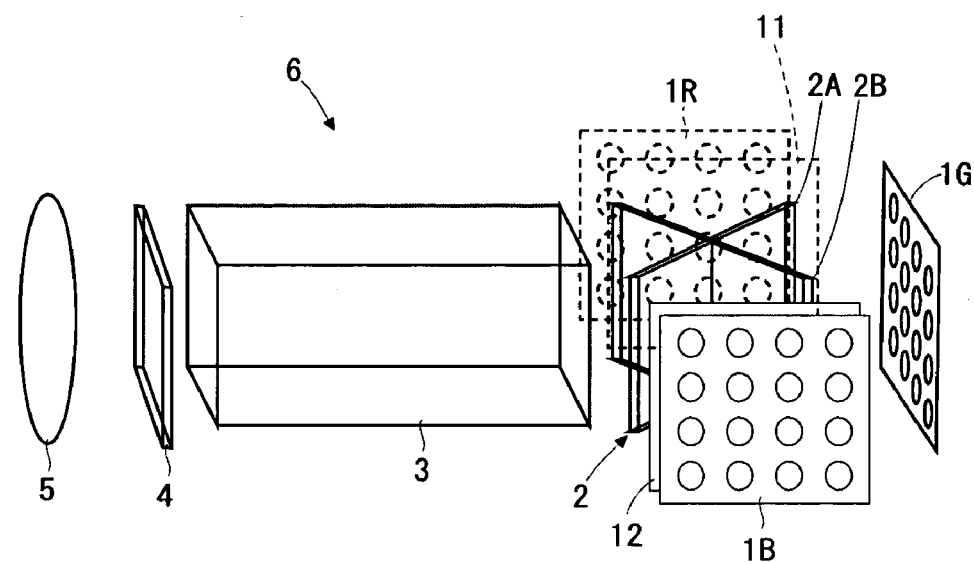
FIG. 1 is a perspective view showing a simplified configuration of a projection type video display of an embodiment of the present invention.

FIG. 1 is a diagram showing an optical system of a single panel-type projection type video display apparatus 6 of this embodiment. The projection type video display apparatus 6 is provided with three LED arrays 1R, 1G, and 1B (hereinafter, a numeral "1" is used for generally referring to each LED array). Each LED array 1 has a configuration in which LEDs (light-emitting diodes) are arranged in an array shape. Aspect ratios of each LED array 1 may be equal to or approximately equal to an aspect ratio of a liquid crystal display panel 4. The LED array 1R emits light in red, the LED array 1G emits light in green, and the LED array 1B emits light in blue. The LED array 1R, the LED array 1G, and the LED array 1B are sequentially lighted in a time-diving manner by a lighting control circuit not shown. It is noted that a light amount increases in a case that each LED array 1 is lighted in a pulse manner than a case that each LED array 1 is lighted continuously.

On a light-incidence side of a rod integrator 3, a cross-shaped time-dividing switching mirror (time-dividing optical switching element) 2 for guiding the light from each LED array 1 to the same or the approximately same direction (in this case, to an edge surface of the rod integrator 3). The LED array 1R and the LED array 1B are positioned in such a manner as to sandwich the cross-shaped time-dividing switching mirror 2 and face each other. In addition, the rod integrator 3, and the LED array 1G, which is the other light source, are positioned in such a manner as to sandwich other specific sides of the cross-shaped time-dividing switching mirror 2.

On a light-emission side of the LED array 1R, a time-dividing mirror (reflecting means) 11 is arranged in such a manner as to be flush with or approximately flush with one side surface of the rod integrator 3, and on a light-emission side of the LED array 1B, a time-dividing mirror (reflecting means) 12 is arranged in such a manner as to be flush with or approximately flush with the other side surface of the rod integrator 3. The time-dividing mirrors 11, 12 serve as the reflecting means for transmitting the light (light in red, and the light in blue) from the LED arrays 1R, 1B, respectively, out of the LED arrays 1R, 1G, and 1B, and on the other hand, reflecting the light (light in green) from the LED array 1G.

On a light-exit side of the rod integrator 3, a liquid crystal display panel 4 is arranged. The liquid crystal display panel 4 has a configuration not provided with a color filter. A liquid crystal display panel driver not shown supplies video signals of respective colors to the liquid crystal display panel 4, in synchronous with timing that the LED arrays 1R, 1G, and 1B are sequentially lighted in a time-dividing manner as described above.

Each light modulated as a result of passing through the liquid crystal display panel 4 (image light) is projected by a projection lens 5, and displayed on a screen not shown.

Figure 2:
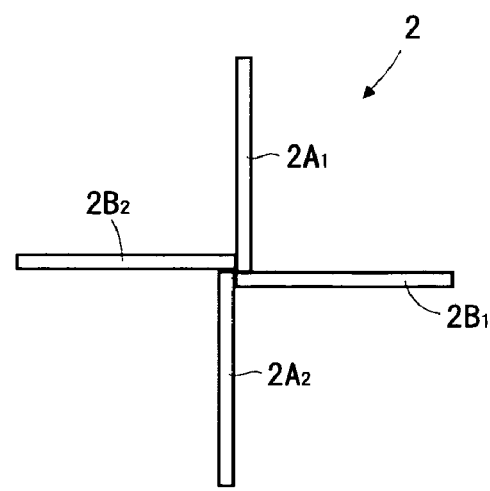
FIG. 2 is a descriptive diagram showing an example of a configuration of a cross-shaped time-dividing switching mirror.

The cross-shaped time-dividing switching mirror 2 described above has a time-dividing mirror 2A and a time dividing mirror 2B, i.e., the time-dividing optical switching elements, arranged in a cross shape. For example, the cross-shaped time-dividing switching mirror 2 is formed in such a manner that the time-dividing mirror 2A is divided in two, and the divided two portions of the time-dividing mirror 2A sandwich the time-dividing mirror 2B. Or, as FIG. 2 shows, the cross-shaped time-dividing switching mirror 2 may be formed in such a manner that two pieces of time-dividing mirrors $2A_1$, $2A_2$ and two pieces of time-dividing mirrors $2B_1$, $2B_2$ are used in a cross arrangement, and each edge of these four pieces of the time-dividing mirrors are brought into close contact.

The cross-shaped time-dividing switching mirror 2, and the time-dividing mirrors 11, 12 are capable of switching either to reflect the light or to transmit the light, depending on whether or not voltage is applied, and may be configured by using DigiLens (registered trademark), which is a switching diffraction element (see Published Japanese translations of PCT international publication for patent applications No. 2002-520648 (more specifically, see columns of [0008], [0009] of the specification), and Published Japanese translations of PCT international publication for patent applications No. 2002-525646), for example. The cross-shaped time-dividing switching mirror 2, and the time-dividing mirrors 11, 12 are controlled by a mirror control circuit not shown. This mirror control circuit brings the time-dividing mirrors into a reflecting state when a certain light source is lighted (this state is established as a result of voltage being applied or as a result of voltage not being applied), and brings the time-dividing mirrors into a transmitting state when another certain light source is lighted (this state is established as a result of voltage not being applied or as a result of voltage being applied). A control content in the mirror control circuit (switching timing between whether to reflect the light or to transmit the light, of the time-dividing mirrors) will be described later.

It is noted that if the switching diffraction element becomes favorable to P-polarized light, for example, all the light may be converted into the P-polarized light at a stage that the light is incident upon the cross-shaped time-dividing switching mirror 2. Such the configuration will be described later.

The rod integrator 3 has a square-tube configuration (hollow configuration) in which an inner surface is a mirror surface, or a square-pole configuration (glass rod). An aspect ratio of the rod integrator 3 is equal to or approximately equal to an aspect ratio of the liquid crystal display panel 4. The rod integrator 3 reflects the light of respective colors from each LED array 1 by the inner surface of the rod integrator 3, and guides the light toward the liquid crystal display panel 4, so that light intensity distribution of the light of respective colors is almost uniform on the liquid crystal display panel 4. It is noted that a shape of the rod integrator 3 is not limited to the square pole (tube), and an entrance portion and an exit portion of a square-shaped aperture may be different in size.

Figure 3:
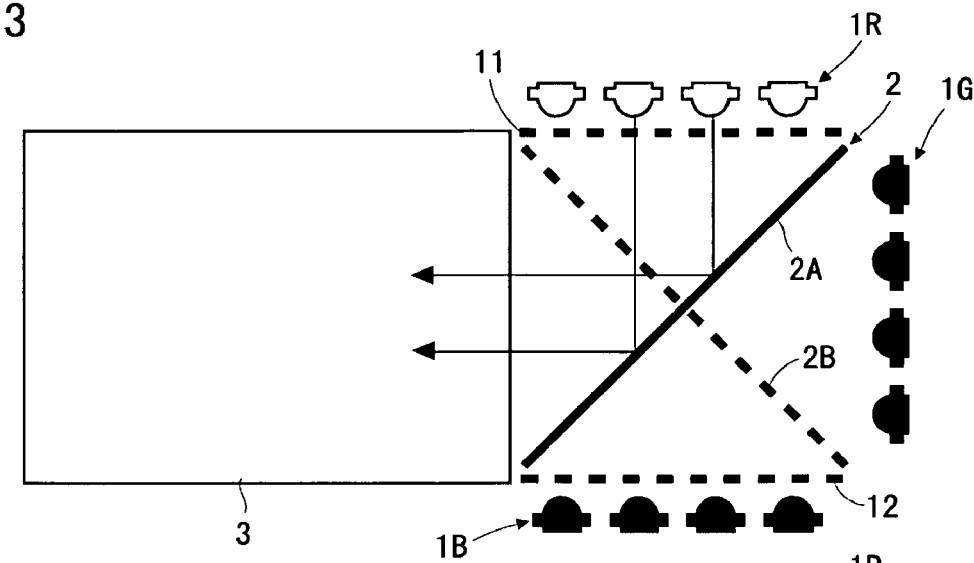
FIG. 3 is a descriptive diagram showing of an illuminating device of an embodiment of the present invention, used in the projection type video display in FIG. 1.
Figure 3:
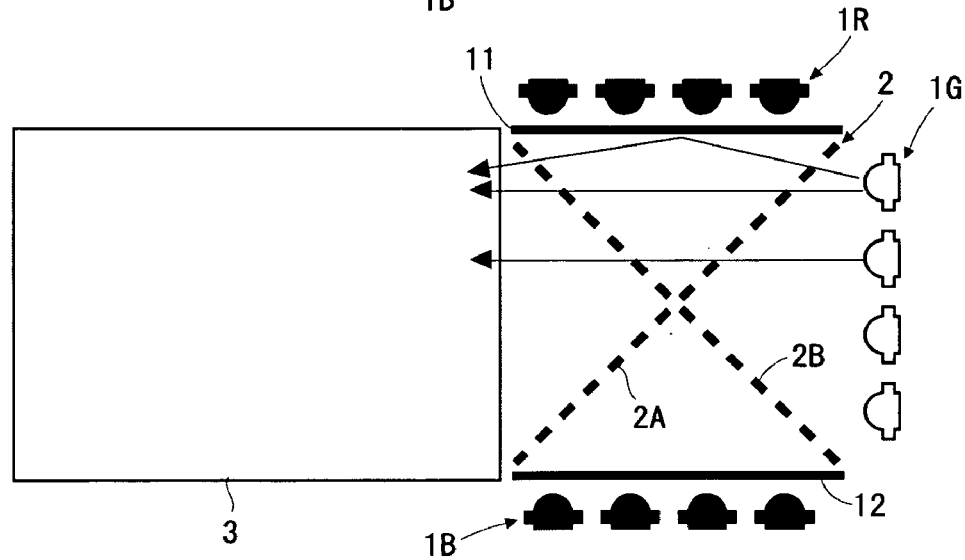
Figure 3:
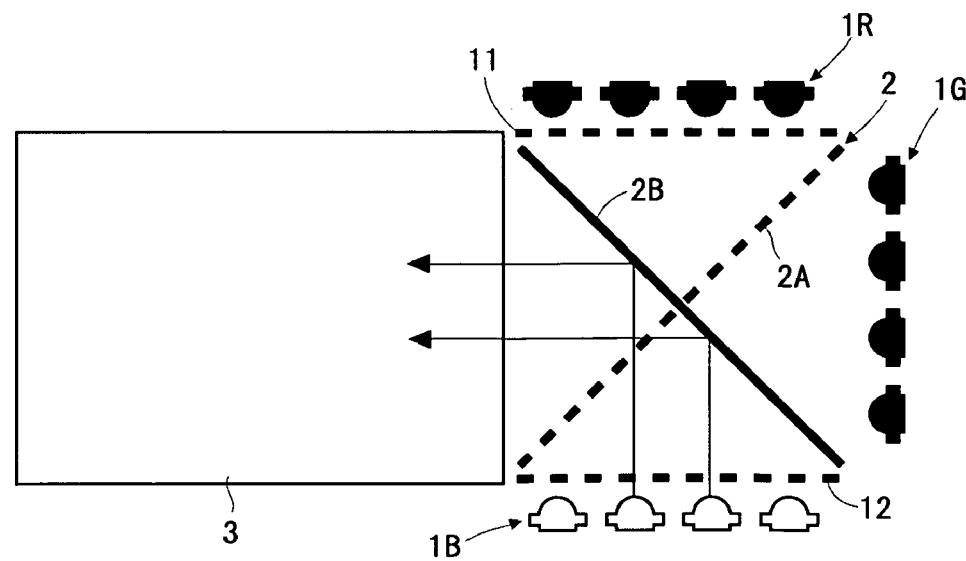

FIG. 3 shows contents of a lighting control of the LED arrays 1R, 1G, and 1B, a reflection/transmission switching control of the time-dividing mirror 2A and the time-dividing mirror 2B constituting the cross-shaped time-dividing switching mirror 2, and a reflection/transmission switching control of the time-dividing mirrors 11, 12. It is noted that in FIG. 3, LEDs to be lighted are indicated by the LEDs in white, and LEDs to be extinguished are indicated by the LEDs in black. Furthermore, the reflecting state in the time-dividing mirrors is indicated by a solid line, and the transmitting state is indicated by a dotted line.

As a portion (a) of FIG. 3 shows, when the LED array 1R is lighted, the time-dividing mirror 2B and the time-dividing mirror 11 are in the transmitting state, and the time-dividing mirror 2A is in the reflecting state. The light in red from the LED array 1R is reflected by the time-dividing mirror 2A, and guided to an inside of the rod integrator 3. It is noted that although the time-dividing mirror 12 is in the transmitting state in FIG. 3, the time-dividing mirror 12 may be in the reflecting state.

As a portion (b) of FIG. 3 shows, when the LED array 1G is lighted, the time-dividing mirror 2A and the time-dividing mirror 2B are in the transmitting state, and the time-dividing mirrors 11, 12 are in the reflecting state. The light in green from the LED array 1G passes through the time-dividing mirror 2A and the time-dividing mirror 2B, and is guided to the inside of the rod integrator 3. Thus, when the light in green is emitted, both the time-dividing mirror 2A and the time-dividing mirror 2B are in the transmitting state, so that it is possible to prevent a loss of the light in green, likely to occur in a conventional configuration in which a cross dichroic mirror is provided. Furthermore, as a result of the time-dividing mirrors 11, 12 being in the reflecting state, the light in green is reflected by the time-dividing mirrors 11, 12. That is, regarding the light in green, the time-dividing mirrors 11, 12 serve a role of the rod integrator. Therefore, uniformity of light intensity of the light on the light-exit side of the rod integrator is improved.

As a portion (c) of FIG. 3 shows, when the LED array 1B is lighted, the time-dividing mirror 2A and the time-dividing mirror 12 are in the transmitting state, and the time-dividing mirror 2B is in the reflecting state. The light in blue from the LED array 1B is reflected by the time-dividing mirror 2B, and guided to the inside of the rod integrator 3. It is noted that although the time-dividing mirror 11 is in the transmitting state in FIG. 3, the time-dividing mirror 11 may be in the reflecting state.

Although the cross-shaped time-dividing switching mirror 2 is arranged as the time-dividing optical switching element in the configuration example described above, this is not always the case. A cross-shaped time-dividing diffraction element may be used as the time-dividing optical switching element. This cross-shaped time-dividing diffraction element may be configured by using the DigiLens (registered trademark) described above, which is the switching diffraction element.

Figure 4:
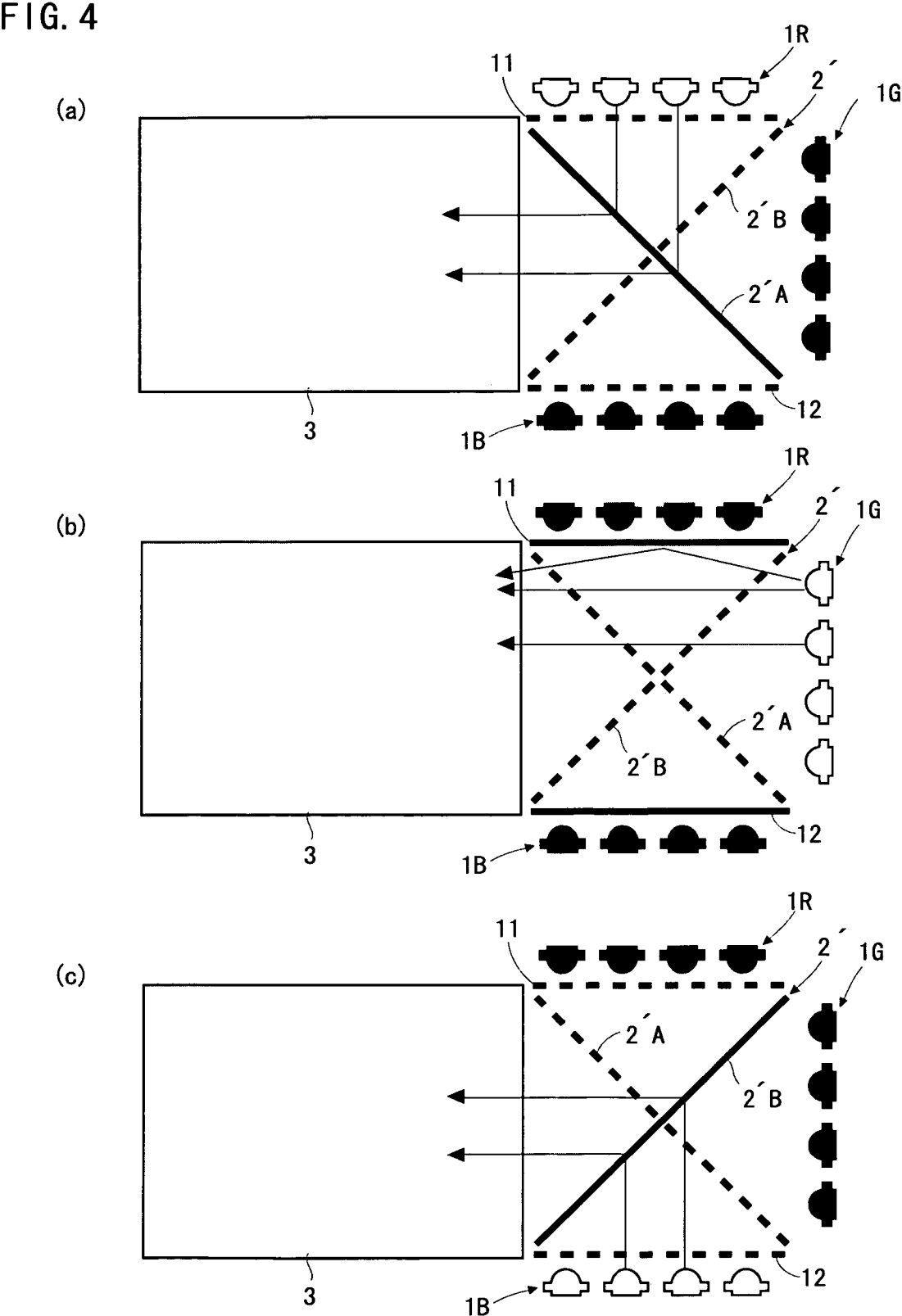
FIG. 4 is a descriptive diagram of another illuminating device of an embodiment of the present invention.

FIG. 4 shows control examples in a case of using a cross-shaped time-dividing diffraction element 2', that is, contents of a lighting control of the LED arrays 1R, 1G, and 1B, a diffraction/transmission switching control between a time-dividing diffraction element 2'A and a time-dividing diffraction element 2'B constituting the cross-shaped time-dividing diffraction element 2', and a reflection/transmission switching control of the time-dividing mirrors 11, 12. It is noted that in FIG. 4, too, the LEDs to be lighted are indicated by the LEDs in white, and LEDs to be extinguished are indicated by the LEDs in black. Furthermore, a diffraction state of the time-dividing diffraction elements 2'A, 2'B is indicated by a solid line, and a transmitting state of the same is indicated by a dotted line. In addition, the reflecting state of the time-dividing mirrors 11, 12 is indicated by a solid line, and a transmitting state of the same is indicated by a dotted line.

As a portion (a) of FIG. 4 shows, when the LED array 1R is lighted, the time-dividing diffraction element 2'B and the time-dividing mirror 11 are in the transmitting state, and the time-dividing diffraction element 2'A is in the diffraction state. The light in red from the LED array 1R is diffracted by the time-dividing diffraction element 2'A, and guided to the inside of the rod integrator 3. It is noted that although the time-dividing mirror 12 is in the transmission state in FIG. 4, the time-dividing mirror 12 may be in the reflecting state.

As a portion (b) of FIG. 4 shows, when the LED array 1G is lighted, the time-dividing diffraction elements 2'A, 2'B are in the transmitting state, and the time-dividing mirrors 11, 12 are in the reflecting state. The light in green from the LED array 1G passes through the time-dividing diffraction elements 2'A, 2'B, and is guided to the inside of the rod integrator 3. Thus, when the light in green is emitted, both the time-dividing diffraction element 2'A and the time-dividing diffraction element 2'B are in the transmitting state, so that it is possible to prevent a loss of the light in green, likely to occur in a conventional configuration in which the cross dichroic mirror is provided. Furthermore, as a result of the time-dividing mirrors 11, 12 being in the reflecting state, the light in green is reflected by the time-dividing mirrors 11, 12. That is, regarding the light in green, the time-dividing mirrors 11, 12 serve a role of the rod integrator. Therefore, uniformity of light intensity of the light in green on the light-exit side of the rod integrator is improved.

As a portion (c) of FIG. 4 shows, when the LED array 1B is lighted, the time-dividing diffraction element 2'A and the time-dividing mirror 12 are in the transmitting state, and the time-dividing diffraction mirror 2'B is in the diffracting state. The light in blue from the LED array 1B is diffracted by the time-dividing diffraction element 2'B, and guided to the inside of the rod integrator 3. It is noted that although the time-dividing mirror 11 is in the transmitting state in FIG. 4, the time-dividing mirror 11 may be in the reflecting state.

Figure 5:
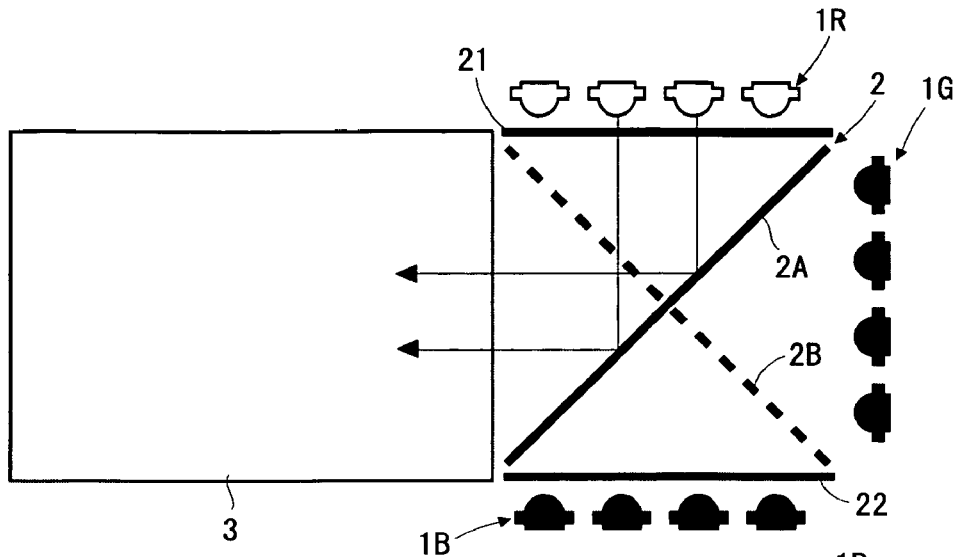
FIG. 5 is a descriptive diagram of another illuminating device of an embodiment of the present invention.
Figure 5:
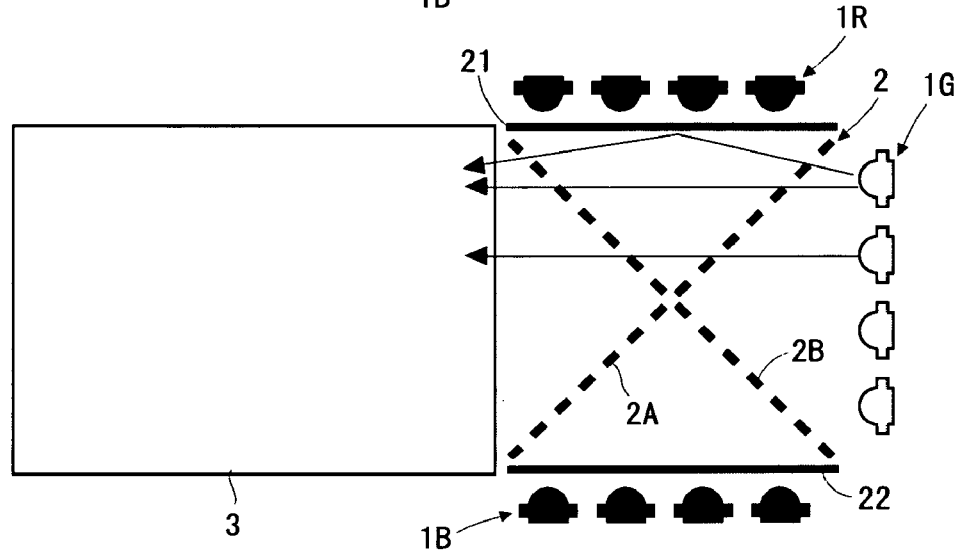
Figure 5:
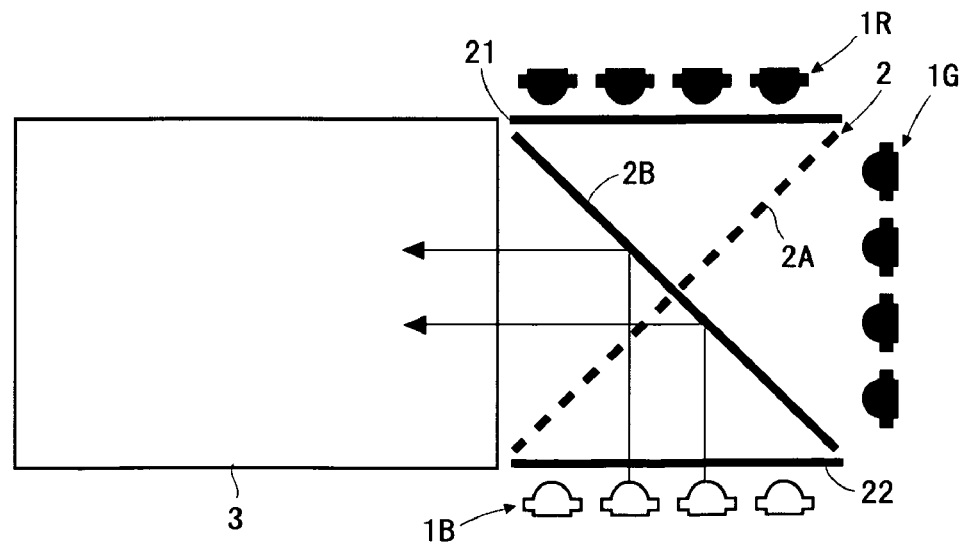

FIG. 5 shows another configuration example. In this configuration, instead of the time-dividing mirror 11 and the time-dividing mirror 12 of the configuration in FIG. 3, a dichroic mirror 21 and a dichroic mirror 22 are provided, respectively. The dichroic mirror 21 transmits the light in red, and reflects the light in other colors. The dichroic mirror 22 transmits the light in blue, and reflects the light in other colors. In such the configuration, the mirror control circuit described above may control only the cross-shaped time-dividing switching mirror 2 (the time-dividing mirror 2A and the time-dividing mirror 2B).

As a portion (a) of FIG. 5 shows, when the LED array 1R is lighted, the time-dividing mirror 2B is in the transmitting state, and the time-dividing mirror 2A is in the reflecting state. The light in red from the LED array 1R passes through the dichroic mirror 21, is reflected by the time-dividing mirror 2A, and guided to the inside of the rod integrator 3.

As a portion of (b) of FIG. 5 shows, when the LED array 1G is lighted, both the time-dividing mirror 2A and the time-dividing mirror 2B are in the transmitting state. The light in green from the LED array 1G passes through the time-dividing mirror 2A and the time-dividing mirror 2B, and is guided to the inside of the rod integrator 3. Thus, when the light in green is emitted, both the time-dividing mirror 2A and the time-dividing mirror 2B are in the transmitting state, so that it is possible to prevent a loss of the light in green, likely to occur in a conventional configuration in which the cross dichroic mirror is provided. Furthermore, the light in green is reflected by the dichroic mirrors 21, 22. That is, regarding the light in green, the dichroic mirrors 21, 22 serve a role of the rod integrator. Therefore, uniformity of light intensity of the light on the light-emit side of the rod integrator is improved.

As a portion (c) of FIG. 5 shows, when the LED array 1B is lighted, the time-dividing mirror 2A is in the transmitting state, and the time-dividing mirror 2B is in the reflecting state. The light in blue from the LED array 1B passes through the dichroic mirror 22, is reflected by the time-dividing mirror 2B, and guided to the inside of the rod integrator 3.

It is noted that the configuration using the dichroic mirrors 21, 22 described above is applicable to the configuration shown in FIG. 4 (configuration using the cross-shaped time-dividing diffraction element 2'). In addition, in the configurations of FIGS. 3, 4, 5 described above, mirrors may be positioned on other sides of the cross-shaped time-dividing switching mirror 2 or the cross-shaped time-dividing diffraction element 2' (e.g., sides on which the time-dividing mirrors 11, 12 are not arranged, that is, a ceiling and bottom sides of the cross-shaped time-dividing switching mirror 2 in FIG. 1). In addition, in the configurations in FIGS. 3, 4, and 5 described above, an optical integrator formed of a pair of fly's eye lenses may be used instead of the rod integrator 3.

Figure 6:
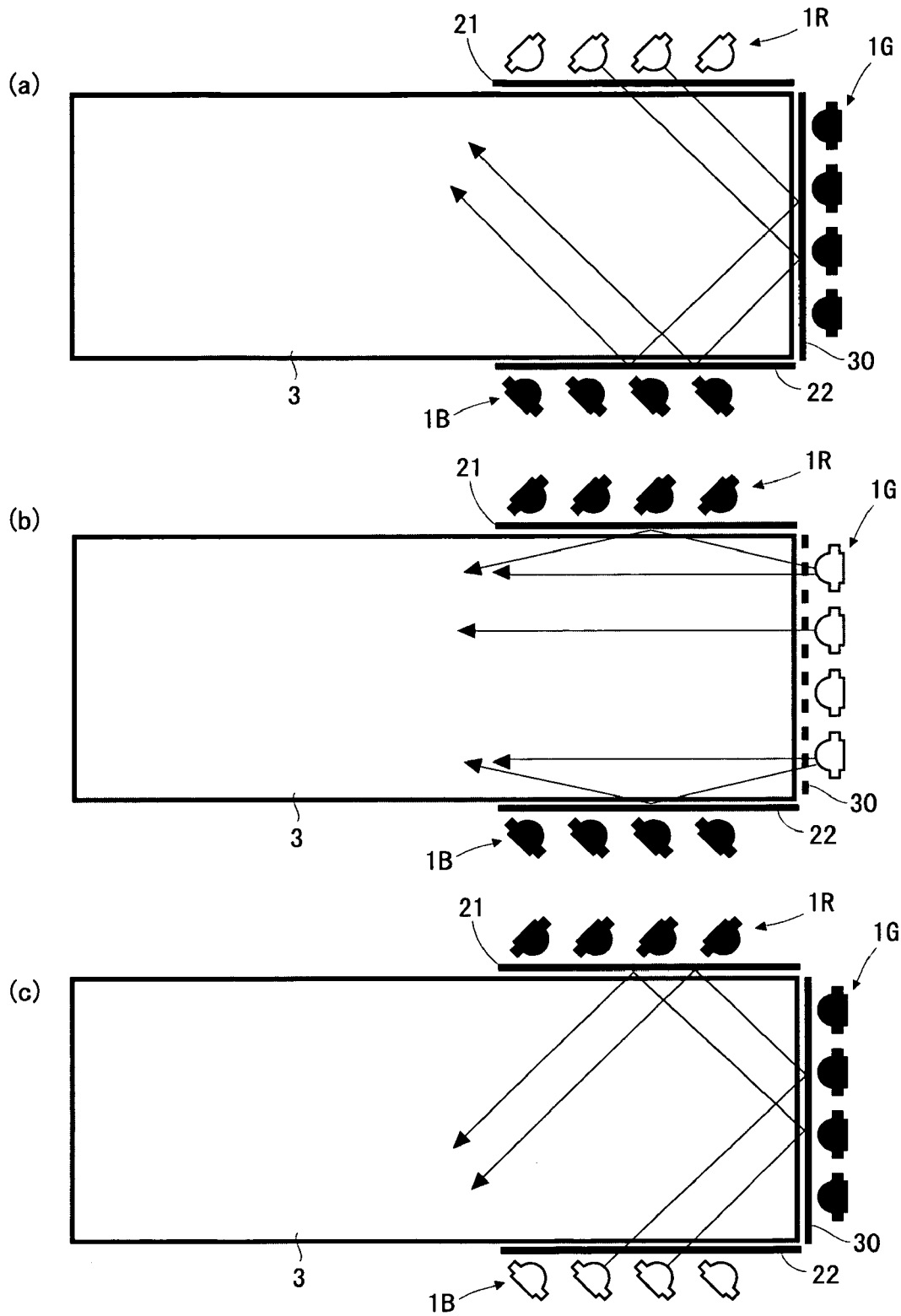
FIG. 6 is a descriptive diagram of another illuminating device of an embodiment of the present invention.

FIG. 6 shows another configuration example. In this configuration, a time-dividing mirror 30 is arranged as the time-dividing optical switching element on the edge surface (light-incidence surface) of the rod integrator 3. This time-dividing mirror 30 guides the light from the LED arrays 1R, 1B into the same or the approximately same direction (to the light-exit side of the rod integrator 3). On the time-dividing mirror 30, the LED array 1G is arranged. In addition, in this configuration example, the dichroic mirrors 21, 22 are arranged on side surfaces of the rod integrator 3, which means on sides close to the above edge surface. In addition, on the dichroic mirror 21, the LED array 1R is arranged, and on the dichroic mirror 22, the LED array 1B is arranged. The dichroic mirrors 21, 22 and the LED arrays 1R, 1B may not always be positioned in such a manner as to face each other. Furthermore, the above LED arrays 1R, 1B are positioned in such a manner that primary optical axes thereof face the above edge surface (light-incidence surface). In addition, the mirror control circuit controls only the above time-dividing mirror 30.

In a case of using the hollow rod integrator 3 of which inner surface is a mirror surface, portions in which the dichroic mirrors 21, 22 are positioned are not the mirror surfaces. In addition, in a case of using the rod integrator in a pole shape, too, portions in which the dichroic mirrors 21, 22 are positioned are constructed so that emitted light from the LED arrays can easily enter the inside of the rod integrator.

As a portion (a) of FIG. 6 shows, when the LED array 1R is lighted, the time-dividing mirror 30 is in the reflecting state. The light in red from the LED array 1R passes through the dichroic mirror 21, enters the inside of the rod integrator 3, and is reflected by the time-dividing mirror 30 arranged on the edge surface. As a result, this light is repeatedly reflected inside the rod integrator 3, and then, exited from the exit surface of the rod integrator 3. That is, the light in red is reflected inside the rod integrator 3 as if to shuttle inside the rod integrator 3, so that the number of reflections increases. Thus, uniformity of light intensity on the emit surface of the rod integrator 3 is improved.

As a portion (b) of FIG. 6 shows, when the LED array 1G is lighted, the time-dividing mirror 30 is in the transmitting state. The light in green from the LED array 1G enters the inside of the rod integrator 3. Since there is no substance that obstructs this light in green, there is almost no loss of the light in green. In addition, the light in green is reflected by the dichroic mirrors 21, 22.

As a portion (c) of FIG. 6 shows, when the LED array 1B is lighted, the time-dividing mirror 30 is in the reflecting state. The light in blue from the LED array 1B passes through the dichroic mirror 22, enters the inside of the rod integrator 3, and is reflected by the time-dividing mirror 30 arranged on the edge surface. As a result, the light in blue is repeatedly reflected inside the rod integrator 3, and then, exited from the exit surface of the rod integrator 3. That is, the light in blue is reflected inside the rod integrator 3 as if to shuttle inside the rod integrator 3, so that the number of reflections increases. Thus, uniformity of light intensity on the emission surface of the rod integrator 3 increases.

Figure 7:
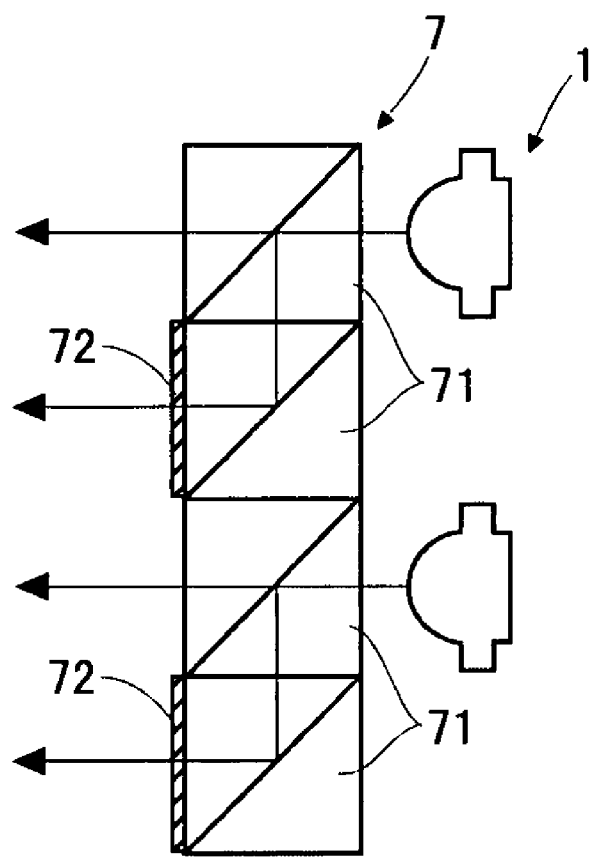
FIG. 7 is a descriptive diagram of light sources provided with a polarization conversion system.

FIG. 7 shows a configuration example in which a polarization conversion system 7 is arranged on a light-emission side of the LED array 1. A basic unit of the polarization conversion system 7 (which corresponds to sizes of light emission portions of each LED) is formed of two polarizing beam splitters (PBS) 71, and retardation plates 72 (½λ plates) positioned on a light-exit side of the other of the two polarizing beam splitters (PBS) 71. Polarized light separating surface of the polarizing beam splitter 71 transmits P-polarized light, and changes an optical path of S-polarized light by 90 degrees. The S-polarized light having the optical path changed is reflected by an adjacent polarized light separating surface, passes through the retardation plate 72, and exited from the polarization conversion system 7. The S-polarized light is converted into the P-polarized light by the above retardation plate 72, and exited from the polarization conversion system 7, so that in this case, almost all light are converted into the P-polarized light.

Furthermore, the polarization conversion system may be arranged on the light-exit side of the rod integrator 3. In this case, a size of a light-exit portion of the polarization conversion system is two times as large as that of the light-exit portion of the rod integrator 3. Therefore, an aspect ratio of an entire shape of the light-exit portion of the polarization conversion system may be preferably approximately equal to an aspect ratio of the liquid crystal panel. In this case, if the aspect ratio of the liquid crystal display panel is A:B, the aspect ratio of the light-exit portion of the rod integrator 3 is A:B/2, for example. In addition, in a case of using the above-described integrator formed of the pair of fly's eye lenses, too, the polarization conversion system may be provided on the light-exit side of the integrator.

In the configuration examples described above, the LED array 1 may be provided with a lens for collimating light. In addition, an LED array in which LED chips are positioned in an array manner, and on light-emission sides of each LED chip, lens cells (for collimating the light, for example) are positioned by a molding, etc., may be used as the LED array 1, for example. In addition, each light source may be one LED of respective colors.

Figure 8:
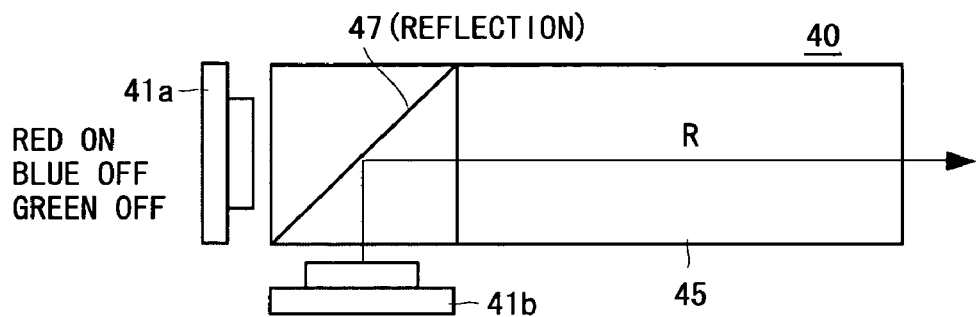
FIG. 8 is a descriptive diagram of another illuminating device of an embodiment of the present invention.
Figure 8:
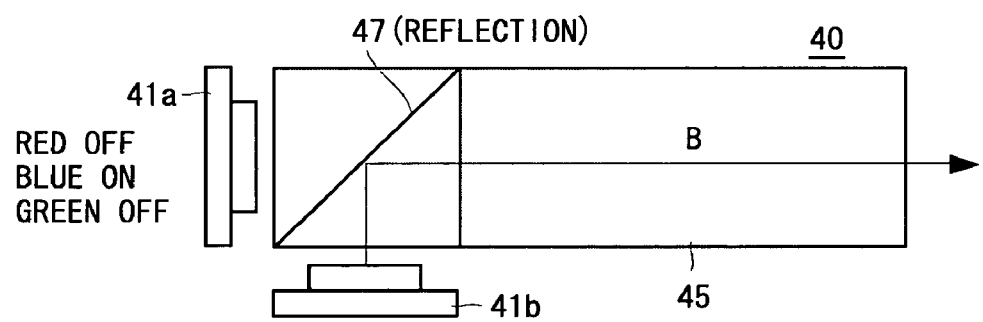
Figure 8:
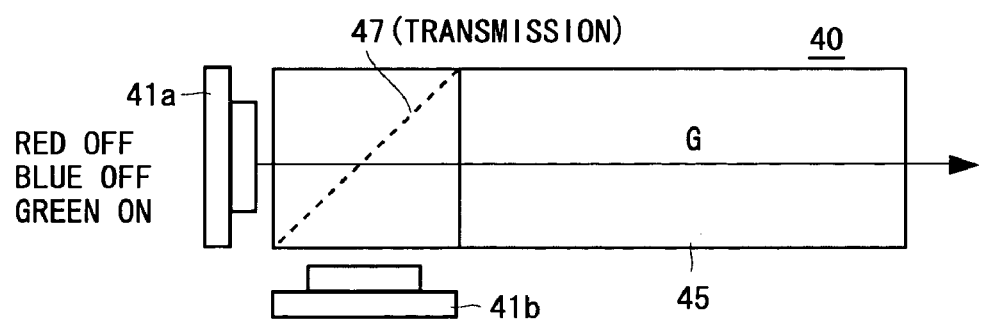

Another configuration example will be described using FIG. 8 to FIG. 10. FIG. 8 is a diagram showing another illuminating device 40 of the present invention. The illuminating device 40 is constituted of light source portions 41a, 41b, a time-dividing mirror 47, a rod integrator 45, etc. The light source portion 41a has four light-in-green LED chips. The light source portion 41b has two light-in-red LED chips, and two light-in-blue LED chips.

Figure 9:
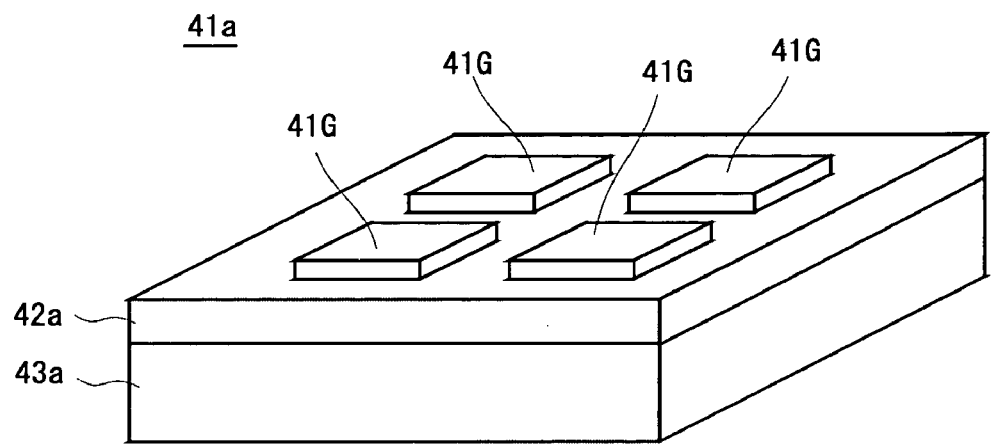
FIG. 9 is a perspective view showing light sources of the illuminating device in FIG. 8.

FIG. 9 is a perspective view showing a configuration of the light source portion 41a. The light source portion 41a is formed of a plate 42a, and four light-in-green LED chips 41G formed on the above plate 42a. The plate 42a is an insulating plate. On a rear surface of the plate 42a, a heat sink 43a is attached, and heat that the LED chip 41G emits is released by the heat sink 43a.

Figure 10:
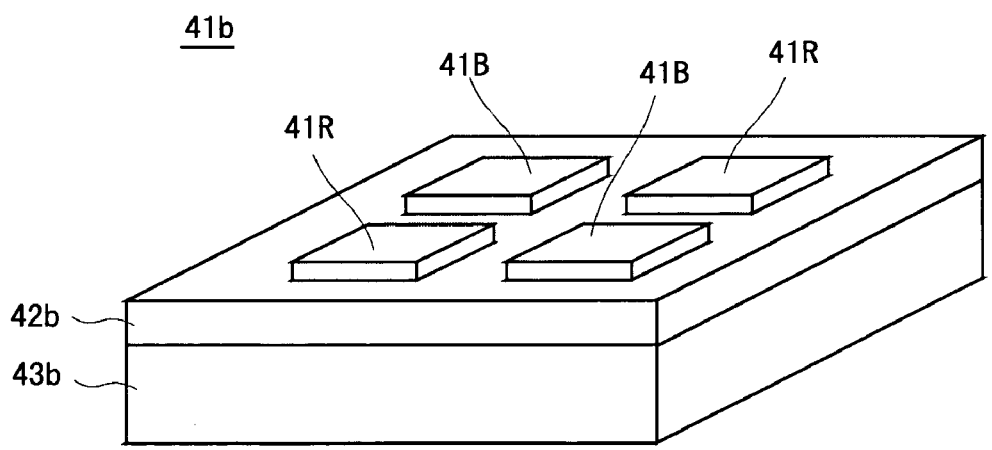
FIG. 10 is a perspective view showing other light sources of the illuminating device in FIG. 8.
Figure 11:
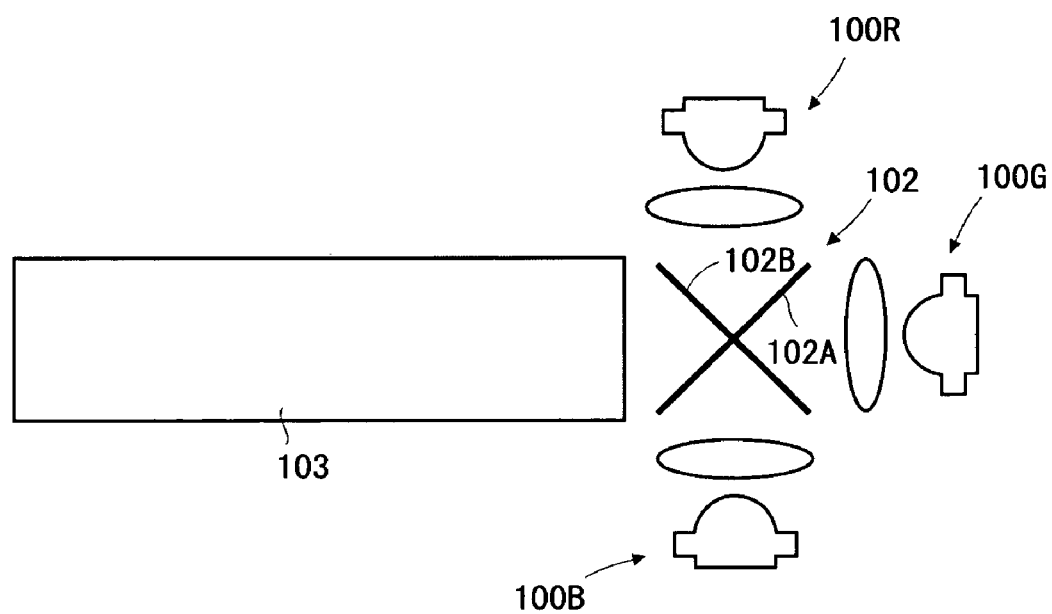
FIG. 11 is a descriptive diagram of a conventional illuminating device.
Figure 12:
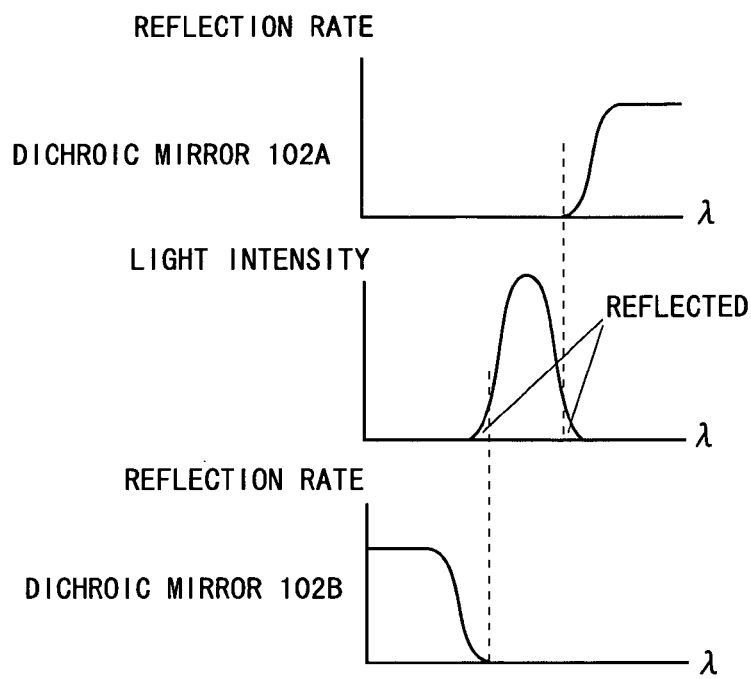
FIG. 12 is a descriptive diagram showing a conventional problem.
Figure 13:
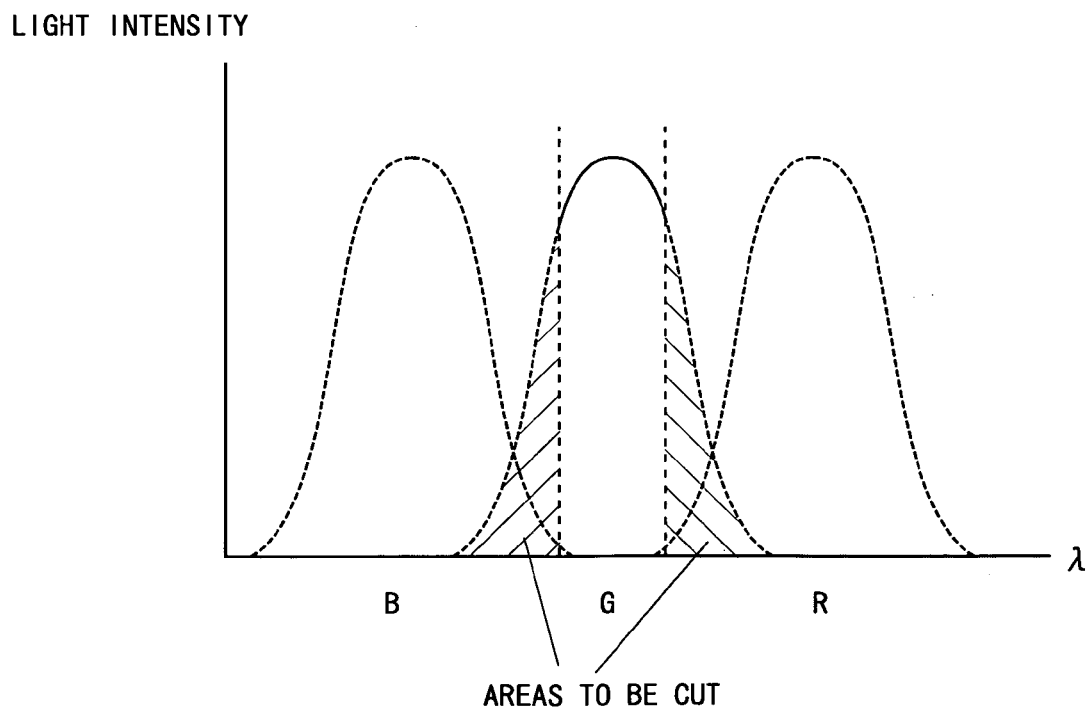
FIG. 13 is a descriptive diagram showing a conventional problem.

FIG. 10 is a perspective view showing a configuration of the light source portion 41b. The light source portion 41b is formed of a plate 42b, two light-in-red LED chips 41R formed on the above plate 42b, and two light-in-blue LED chips 41B formed on the above plate 42b. On a rear surface of the plate 42b, a heat sink 43b is attached, and heat that the LED chips 41R, 41B emit is released by the heat sink 43a.

It is noted that in this illuminating device 40, the number of light-in-green LED chips is larger than that of the light-in-blue LED chips or that of the light-in-red LED chips. A reason why the number of chips thus differ is that the illuminating device 40 is rendered capable of emitting light in white. Compared to the light in blue or the light in red, the light in green is high in visual sensitivity, and therefore, it is needed to make luminance of the light in green $(cd/m^2)$(candela per meter squared) higher than those of the light in blue and the light in red. Thus, as a result of the number of the light-in-green LED chips 41G being larger than those of LED chips of the other colors, deficiency in luminance of the light in green may be overcome.

Or, in a case of configuring an illuminating device for emitting the light in white by using LED light sources of three colors having certain spectrums (where emitting-light amounts of the LED light sources of respective colors in light, that is, blue, red, and green, are Lr, Lb, and Lg, respectively), if it is assumed that it is known to be possible to generate the light in white when a light amount ratio of respective colors (red to blue to green) is Lr':Lb':Lg', the number of light sources of the light in color having a minimum value, out of respective values of Lr/Lr', Lb/Lb', and Lg/Lg', may be larger than any other light source.

The time-dividing mirror 47 is capable of switching either to reflect the light or to transmit the light, depending on whether or not voltage is applied, and may be configured by using DigiLens (registered trademark), which is a switching diffraction element (see Published Japanese translations of PCT international publication for patent applications No. 2002-520648 (more specifically, see columns of [0008], [0009] of the specification), and Published Japanese translations of PCT international publication for patent applications No. 2002-525646), for example. The time-dividing 47 is controlled by a mirror control circuit not shown.

The LED chips of respective colors in the light source portions 41a, 41b are operated and turned on/off in a time-dividing manner. The time-dividing mirror 47 is switched in synchronous with an on/off operation of the LED chips of respective colors of the light sources 41a, 41b.

For example, the light sources of respective colors of the light source portions 41a, 41b are lighted in the order of red, blue, and green. When the light-in-red LED chips of the light source portion 41b are lighted, the time-dividing mirror 47 reflects the light in red, and guides this reflected light toward the rod integrator 45 (see a portion (a) in FIG. 8). When the light-in-blue LED chips of the light source portion 41b are lighted, the time-dividing mirror 47 reflects the light in blue, and guides this reflected light toward the rod integrator 45 (see a portion (b) in FIG. 8). When the light-in-green LED chips of the light source portion 41a are lighted, the time-dividing mirror 47 transmits the light in green, and guides this transmitted light toward the rod integrator (see a portion (c) in FIG. 8). That is, the mirror control circuit controlling the time-dividing mirror 47 brings the time-dividing mirror into a reflecting state when a certain light source is lighted (this state is established as a result of voltage being applied or as a result of voltage not being applied), and brings the time-dividing mirror in a transmitting state when another certain light source is lighted (this state is established as a result of voltage not being applied or as a result of voltage being applied).

Thus, the illuminating device 40 shown in FIG. 8, too, is capable of guiding the light from each light source to the same or the approximately same direction, not using the cross dichroic mirror, and reducing a loss of light from each light source as mush as possible. In addition, a projection type video display apparatus similar to the above-described projection type video display apparatus 6 may be configured by using this illuminating device 40.

In addition, although in the above configuration examples, the projection type video display apparatus 6 is provided with a transmission-type liquid crystal display panel 4, this is not always the case. A reflection-type liquid crystal display panel may be used, and in addition, instead of these liquid crystal display panels, a display panel, which individually drives micro-mirrors serving as dots, may be used. Furthermore, the solid light-emitting element is not always the light-emitting diode (LED), and an organic/inorganic electroluminescence, etc., may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An illuminating device, comprising:
   a light source for emitting light in red;
   a light source for emitting light in green;
   a light source for emitting light in blue;
   a lighting control means for lighting the three light sources in a time-dividing manner;
   a time-dividing optical switching element arranged for guiding the light from each light source into the same or the approximately same direction, and capable of switching either to reflect the light or to transmit the light, depending on whether or not voltage is applied to the time-dividing optical switching element;
   an element control means for bringing the time-dividing optical switching element into a reflecting state when a certain light source is lighted, and bringing the time-dividing optical switching element into a transmitting state when another certain light source is lighted;
   an optical integrator for rendering uniform intensity of light incident from each light source; and
   reflecting means arranged on light-emission sides of the two light sources out of the three light sources, and each configured to selectively transmit light from a respective one of the two light sources, and alternately to reflect the light from the third light source of the three.

2. An illuminating device according to claim 1, wherein
   the time-dividing optical switching element is arranged in a cross manner,
   the two light sources are positioned in such a manner as to sandwich the cross-shaped time-dividing optical switching element and as to face each other,
   the optical integrator and the third light source of the three are positioned in such a manner as to sandwich other specific sides of the cross-shaped time-dividing optical switching element, and furthermore,
   on the light-emission sides of the two light sources, as the reflecting means, time-dividing mirrors capable of switching either to reflect the light or to transmit the light, depending on whether or not the voltage is applied, are arranged in such a manner as to be flush with or approximately flush with side surfaces of the optical integrator, and
   the time-dividing mirrors are controlled, as a result of voltage being applied or not being applied, in order that the time-dividing mirrors are in the reflecting state when the third light source of the three is lighted.

3. An illuminating device according to claim 1, wherein
   the time-dividing optical switching element is arranged in a cross manner,
   the two light sources are positioned in such a manner as to sandwich the cross-shaped time-dividing optical switching element and as to face each other,
   the optical integrator and the other light source are positioned in such a manner as to sandwich other specific sides of the cross-shaped time-dividing optical switching element, and furthermore,
   on the light-emission sides of the two light sources, dichroic mirrors, as the reflecting means, are arranged in such a manner as to be flush with or approximately flush with side surfaces of the optical integrator.

4. An illuminating device according to claim 2, wherein the third light source of the three is a light source for emitting light in green.

5. An illuminating device according to claim 3, wherein the third light source of the three is a light source for emitting light in green.

6. An illuminating device according to claim 1, wherein the optical integrator is a tube-shaped or a pole-shaped rod integrator, the time-dividing optical switching element is arranged on an edge side of the rod integrator, a first dichroic mirror, as the reflecting means, is positioned on a side surface of the rod integrator, a second dichroic mirror, as the reflecting means, is positioned on the other side surface of the rod integrator, the light source arranged on the first dichroic mirror is positioned in such a manner that a main light axis of the light source faces the edge side, the light source arranged on the second dichroic mirror is positioned in such a manner that a main light axis of the light source faces the edge side, and the third light source of the three is positioned on the time-dividing optical switching element.

7. An illuminating device according to claim 6, wherein the third light source of the three arranged on the time-dividing optical switching element is a light source for emitting light in green.

8. An illuminating device according to claim 1, wherein each of the light sources is formed of one or a plurality of solid light-emitting elements.

9. An illuminating device according to claim 1, wherein on a light-emission side of the light source, there is provided a polarization conversion system for redirecting a polarization of the light to a common direction.

10. An illuminating device according to claim 1, wherein on a light-exit side of the optical integrator, there is provided a polarization conversion system for redirecting a polarization of light to a common direction.

11. A projection type video display apparatus, comprising:
the illuminating device according to claim 1;
a video display panel arranged on a light-exit side of the optical integrator;
a panel driver for supplying video data of respective colors to the video display panel corresponding to lighting timing of the light sources; and
a projection means for projecting image light optically modulated as a result of passing through the video display panel.

12. An illuminating device, comprising:
a light source for emitting light in red;
a light source for emitting light in green;
a light source for emitting light in blue;
a lighting control means for lighting the three light sources in a time-dividing manner;
a time-dividing optical switching element arranged for guiding the light from each light source into the same or the approximately same direction, and capable of switching either to diffract the light or to transmit the light, depending on whether or not voltage is applied to the time-dividing optical switching element;
an element control means for bringing the time-dividing optical switching element into a diffracting state when a certain light source is lighted, and bringing the time-dividing optical switching element into a transmitting state when another certain light source is lighted;
an optical integrator for rendering uniform intensity of light incident from each light source; and
reflecting means arranged on light-emission sides of the two light sources out of the three light sources, and each configured to selectively transmit light from a respective one of the two light sources, and alternately to reflect the light from the third light source of the three.

13. An illuminating device according to claim 12, wherein
the time-dividing optical switching element is arranged in a cross manner,
the two light sources are positioned in such a manner as to sandwich the cross-shaped time-dividing optical switching element and as to face each other,
the optical integrator and the third light source of the three are positioned in such a manner as to sandwich other specific sides of the cross-shaped time-dividing optical switching element, and furthermore,
on the light-emission sides of the two light sources, as the reflecting means, time-dividing mirrors capable of switching either to reflect the light or to transmit the light, depending on whether or not the voltage is applied, are arranged in such a manner as to be flush with or approximately flush with side surfaces of the optical integrator, and
the time-dividing mirrors are controlled, as a result of voltage being applied or not being applied, in order that the time-dividing mirrors are in the reflecting state when the third light source of the three is lighted.

14. An illuminating device according to claim 12, wherein
the time-dividing optical switching element is arranged in a cross manner,
the two light sources are positioned in such a manner as to sandwich the cross-shaped time-dividing optical switching element and as to face each other,
the optical integrator and the other light source are positioned in such a manner as to sandwich other specific sides of the cross-shaped time-dividing optical switching element, and furthermore,
on the light-emission sides of the two light sources, dichroic mirrors, as the reflecting means, are arranged in such a manner as to be flush with or approximately flush with side surfaces of the optical integrator.

15. An illuminating device according to claim 13, wherein the third light source of the three is a light source for emitting light in green.

16. An illuminating device according to claim 14, wherein the third light source of the three is a light source for emitting light in green.

17. An illuminating device according to claim 12, wherein each of the light sources is formed of one or a plurality of solid light-emitting elements.

18. An illuminating device according to claim 12, wherein on light-emission sides of the light sources, there are provided polarization conversion systems for redirecting a polarization of light to a common direction.

19. An illuminating device according to claim 12, wherein on light-exit side of the optical integrator, there is provided a polarization conversion system for redirecting a polarization of light to a common direction.

20. A projection type video display apparatus, comprising:
the illuminating device according to claim 12;
a video display panel provided on a light-exit side of the optical integrator;
a panel driver for supplying video data of respective colors to the video display panel corresponding to lighting timing of the light sources; and
a projection means for projecting image light optically modulated as a result of passing through the video display panel.

* * * * *